United States Patent
Ishii

(10) Patent No.: US 8,520,290 B2
(45) Date of Patent: Aug. 27, 2013

(54) DISPLAY SYSTEM FOR HIGHER GRAYSCALE WITH A VARYING LIGHT SOURCE

(75) Inventor: Fusao Ishii, Pittsburg, PA (US)

(73) Assignee: Silicon Quest Kabushiki Kaisha (JP)

( * ) Notice: Subject to any disclaimer, the term of this patent is extended or adjusted under 35 U.S.C. 154(b) by 181 days.

(21) Appl. No.: 12/807,646

(22) Filed: Sep. 10, 2010

(65) Prior Publication Data

US 2011/0128607 A1 Jun. 2, 2011

Related U.S. Application Data

(63) Continuation-in-part of application No. 12/286,838, filed on Oct. 1, 2008, now Pat. No. 8,064,125, and a continuation-in-part of application No. 11/893,696, filed on Aug. 16, 2007, now Pat. No. 7,492,378.

(60) Provisional application No. 61/398,813, filed on Jul. 1, 2010.

(51) Int. Cl.
*G02B 26/00* (2006.01)

(52) U.S. Cl.
USPC .......................................... 359/290

(58) Field of Classification Search
USPC ......... 359/290–293, 295, 298, 237, 220–224, 359/230–234, 223.1, 224.1, 242; 345/33, 345/48, 84, 589, 598, 599, 643
See application file for complete search history.

(56) References Cited

U.S. PATENT DOCUMENTS

| | | | | |
|---|---|---|---|---|
| 6,008,929 A * | 12/1999 | Akimoto et al. | ............. | 359/264 |
| 7,133,022 B2 * | 11/2006 | Grabert | ........................ | 345/156 |
| 7,550,251 B2 * | 6/2009 | McLean et al. | ............... | 430/300 |
| 8,130,185 B2 * | 3/2012 | Handschy et al. | ............. | 345/87 |
| 2008/0012805 A1 * | 1/2008 | Duncan et al. | .................. | 345/84 |
| 2011/0043764 A1 * | 2/2011 | Narikawa | ........................ | 353/31 |

* cited by examiner

*Primary Examiner* — Tuyen Tra
(74) *Attorney, Agent, or Firm* — Bo-In Lin

(57) ABSTRACT

The present invention provides a projection apparatus that includes:
at least one spatial light modulator (SLM) and at least one variable light source and at least one control unit controlling said SLM and/or said light source and said SLM has a minimum controllable time period and said control unit controls said SLM providing said minimum controllable time periods of the modulation of said SLM at least twice in a frame period and said control unit controls said light source during said minimum controllable time periods.

14 Claims, 16 Drawing Sheets

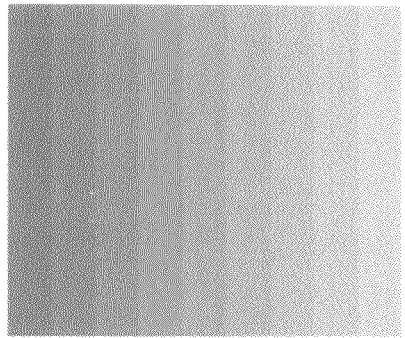
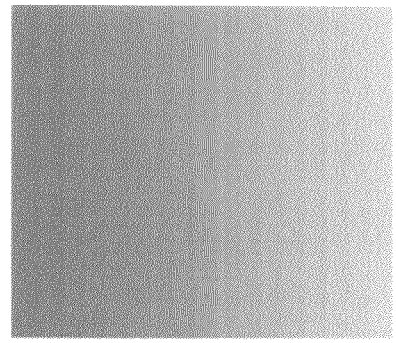
Lower gray scale     Higher gray scale
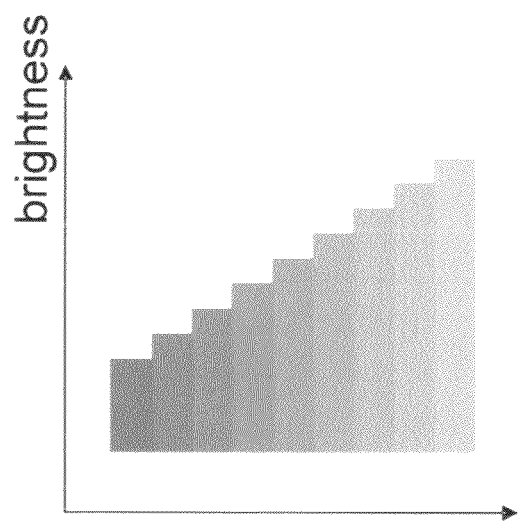
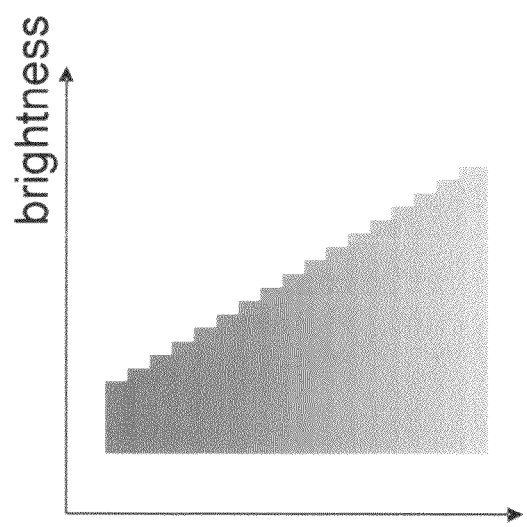
Less levels of brightness     More levels of brightness
Fig 2A     Fig 2B Time Domain Grayscale Control (TDGC)

| Bit | Bit Duration | Light Intensity | Output light energy |
|---|---|---|---|
| D5 | 32 | 1 | 32 |
| D4 | 16 | 1 | 16 |
| D3 | 8 | 1 | 8 |
| D2 | 4 | 1 | 4 |
| D1 | 2 | 1 | 2 |
| D0 | 1 | 1 | 1 |
| Total | 63 | | 63 |

Light Width Grayscale Control ( LWGC)

| Bit | Bit Duration | Light Duration | Output light energy | Relative output energy |
|---|---|---|---|---|
| D5 | 1 | 1 | 1 | 32 |
| D4 | 1 | 1/2 | 0.5 | 16 |
| D3 | 1 | 1/4 | 0.25 | 8 |
| D2 | 1 | 1/8 | 0.125 | 4 |
| D1 | 1 | 1/16 | 0.0625 | 2 |
| D0 | 1 | 1/32 | 0.03125 | 1 |
| Total | 6 |  | 1.96875 | 63 |

Light Intensity Grayscale Control ( LIGC)

| Bit | Bit Duration | Light Intensity | Output light energy | Relative output energy |
|---|---|---|---|---|
| D9 | 32 | 1 | 32 | 512 |
| D8 | 16 | 1 | 16 | 256 |
| D7 | 8 | 1 | 8 | 128 |
| D6 | 4 | 1 | 4 | 64 |
| D5 | 2 | 1 | 2 | 32 |
| D4 | 1 | 1 | 1 | 16 |
| D3 | 1 | 1/2 | 0.5 | 8 |
| D2 | 1 | 1/4 | 0.25 | 4 |
| D1 | 1 | 1/8 | 0.125 | 2 |
| D0 | 1 | 1/16 | 0.0625 | 1 |
| Total | 67 |  | 63.9375 | 1023 |

Fig.11B

| Bit | Bit Duration | Light Intensity | Output light energy | Relative output energy |
|---|---|---|---|---|
| D15 | 128 | 1 | 128 | 32768 |
| D14 | 64 | 1 | 64 | 16384 |
| D13 | 32 | 1 | 32 | 8192 |
| D12 | 16 | 1 | 16 | 4096 |
| D11 | 8 | 1 | 8 | 2048 |
| D10 | 4 | 1 | 4 | 1024 |
| D9 | 2 | 1 | 2 | 512 |
| D8 | 1 | 1 | 1 | 256 |
| D7 | 1 | 1/2 | 0.5 | 128 |
| D6 | 1 | 1/4 | 0.25 | 64 |
| D5 | 1 | 1/8 | 0.125 | 32 |
| D4 | 1 | 1/16 | 0.0625 | 16 |
| D3 | 1 | 1/32 | 0.03125 | 8 |
| D2 | 1 | 1/64 | 0.015625 | 4 |
| D1 | 1 | 1/128 | 0.0078125 | 2 |
| D0 | 1 | 1/256 | 0.00390625 | 1 |
| Total | 263 | | 255.9960938 | 65535 |

DISPLAY SYSTEM FOR HIGHER GRAYSCALE WITH A VARYING LIGHT SOURCE

CROSS-REFERENCE TO RELATED APPLICATIONS

This application is a Non-provisional Application of a Provisional Application 61/398,813 filed on Jul. 1, 2010. The Provisional Application 61/398,813 and this application is a Continuation in Part (CIP) Application of a U.S. patent application Ser. No. 12/286,838 filed on Oct. 1, 2008, now issued as U.S. Pat. No. 8,064,125, and application Ser. No. 11/893,696 filed on Aug. 23, 2007 now issued as U.S. Pat. No. 7,492,378. The disclosures made in these patent Applications including 61/398,813, 12/286,838, now issued as U.S. Pat. No. 8,064,125, and 11/893,696 are hereby incorporated by reference in this patent Application.

BACKGROUND OF THE INVENTION

1. Field of the Invention

The present invention relates to an image display system that modulates the illumination light transmitted from a light source according to image signals for projecting and displaying images. More particularly, this invention relates to an image display system implemented with a light source controlled to project light of variable intensities to further increase the number of gray scales for improving the quality of image display.

2. Description of the Related Arts

After the dominance of CRT technology in the display industry over the past 100 years, the Flat Panel Display (hereafter FPD) and Projection Display technologies are now gaining popularity because of a smaller form-factor of the display control system while enabled to project and display image of greater size onto a bigger display screen. Among several types of projection display systems, projection display systems using micro-display are gaining consumers' recognition because of high performance of picture quality as well as lower cost than the display systems implemented with FPDs. There are two types of micro-display technologies implemented in the projection display systems now made available in the market. The first type of display system is the micro-LCD (Liquid Crystal Display) system and the other type display system is the display system that implements the micromirror technology. Because a micromirror device uses un-polarized light, a micromirror device has an advantage that the display image projected from the micromirror device has a higher brightness over the display image projected from a micro-LCD system, which uses polarized light.

Even though there are significant advances of the technologies in implementing an electromechanical mirror device as a spatial light modulator (SLM) in recent years, there are still limitations and difficulties when it is employed to provide a high quality image. Specifically, when the images are digitally controlled, the image quality is adversely affected due to the fact that the images are not displayed with sufficient levels of gray scales.

An electromechanical mirror device is drawing a considerable interest for application as a spatial light modulator (SLM). The electromechanical mirror device includes "a mirror array" that has a large number of mirror elements. In general, the mirror elements from 60,000 to several millions are arranged on a surface of a substrate in an electromechanical mirror device. In order to better understand this invention, the following background descriptions are presented followed by discussions of why the conventional technologies as now available on the marketplace and the state of the art of image display devices still confronted with technical difficulties and limitations.

Outline of the Device

The first is a description of a mirror device. Image projection apparatuses implemented with a spatial light modulator (SLM), such as a transmissive liquid crystal, a reflective liquid crystal, a mirror array and other similar image modulation devices, are widely known.

A spatial light modulator is formed as a two-dimensional array of optical elements, ranging from tens of thousands to millions of miniature modulation elements, with individual elements enlarged and displayed as the individual pixels corresponding to an image to be displayed onto a screen by way of a projection lens.

The spatial light modulators generally used for projection apparatuses primarily include two types, i.e., a liquid crystal device for modulating the polarizing direction of incident light by sealing a liquid crystal between transparent substrates and providing them with a potential, and a mirror device deflecting miniature micro electro mechanical systems (MEMS) mirrors with electrostatic force and controlling the reflecting direction of illumination light.

One embodiment of the above described mirror device is disclosed in U.S. Pat. No. 4,229,732, in which a drive circuit using MOSFET and deflectable metallic mirrors are formed on a semiconductor wafer substrate. The mirror deflects to different angles according to the electrostatic force supplied from the drive circuit and is capable of changing the reflecting direction of the incident light.

Meanwhile, U.S. Pat. No. 4,662,746 has disclosed an embodiment in which one or two elastic hinges retain a mirror. If the mirror is retained by one elastic hinge, the elastic hinge functions as bending spring. If the mirror is retained by two elastic hinges, they function as torsion springs to incline the mirror, thereby the deflecting the reflecting direction of incident light.

As described above, the ON-and-OFF states of a micromirror control scheme as that implemented in U.S. Pat. No. 5,214,420 and by most conventional display systems limits display quality. Specifically, conventional control circuits limits the gray scale (PWM between ON and OFF states) since it is limited by the LSB (least significant bit, or the least pulse width). Due to the ON-OFF states implemented in conventional systems, there is no way to provide a shorter pulse width than the LSB. The lowest brightness, which determines the gray scale, is the light reflected during the least pulse width. The limited gray scale leads lower image quality.

Specifically, FIG. 1C exemplifies a conventional control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5 and M7 are p-channel transistors; transistors, M6, M8, and M9 are n-channel transistors. The capacitances, C1 and C2, represent the capacitive loads of the memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 is accessed and written by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The mirror driven by a drive electrode abuts a landing electrode structured differently from the drive electrode, thereby a prescribed tilt angle is maintained. A "landing chip", which possesses a spring property, is formed on the point of contact between the landing electrode and the mirror. This configuration enhances the deflection of the mirror to the reverse direction upon a change in the control. The parts forming the landing chip and the landing electrode are maintained at the same potential so that contact will not cause a shorting or other similar disruption.

Outline of Time Domain Grayscale Control

The following description explains the pulse-width modulation (PWM) control using Time Domain Grayscale Control.

As described above and shown in FIG. 1A, an operation for switching the mirror by the control circuit deflects the micromirrors in either an ON or an OFF angular orientation.

The brightness, i.e., the gray scales of display for a digitally controlled image system is determined by the length of time the micromirror stays at an ON position. The length of time a micromirror is controlled at an ON position is controlled by a multiple bit word. FIG. 1D shows the "binary time intervals" when the micromirror is controlled by a four-bit word. As in FIG. 1D, the time durations have relative values of 1, 2, 4, 8 that, in turn, define the relative brightness for each of the four bits where 1 is the least significant bit and 8 is the most significant bit. According to the control mechanism as shown, the minimum controllable differences between gray scales for showing different brightness is the brightness represented by the "least significant bit" that can maintain the micromirror at an ON position.

In a simple exemplary display system operated with an n bits brightness control signal for controlling the gray scales, the frame time is divided into $2^n-1$ equal time slices. For a 5.56 milliseconds frame period for each color (1/(60×3) seconds=5.56 milliseconds) and n-bit intensity values, the time slice is $5.56/(2^n-1)$ milliseconds.

Having established these time slices for controlling the length of time for displaying each pixel in each frame, the pixel intensities are determined by the number of time slices represented by each bit. Specifically, a display of a black pixel is represented by 0 time slices. The intensity level represented by the LSB is 1 time slice, and maximum brightness is $2^n-1$ time slices. The number time slices that a micromirror is controlled to operate at an On-state in a frame period determines a specifically quantified light intensity of each pixel corresponding to the micromirror reflecting a modulated light to that pixel. Thus, during a frame period, each pixel corresponding to a modulated micromirror controlled by a control word with a quantified value of more than 0 is operated at an on state for the number of time slices that correspond to the quantified value represented by the control word. The viewer's eye integrates the pixels' brightness so that the image appears the same as if it were generated with analog levels of light.

For addressing deformable mirror devices, a pulse width modulator (PWM) receives the data formatted into "bit-planes". Each bit-plane corresponds to a bit weight of the intensity value. Thus, if each pixel's intensity is represented by an n-bit value, each frame of data has n bit-planes. Each bit-plane has a 0 or 1 value for each display element. In the example described in the preceding paragraphs, each bit-plane is separately loaded during a frame. The display elements are addressed according to their associated bit-plane values. For example, the bit-plane representing the LSBs of each pixel is displayed for 1 time slice.

As shown in FIG. 3A, the signal bit data described as "Dn" where n is 0 through 5 has 6 bits in total and each bit contains 0 or 1. The bit Dn will be transferred to the memory of the SLM and kept during the time duration of $(2^n-1)$ times Bit Time which is the minimum controllable time of the SLM.

As shown in FIG. 3B, the combination of 0 and 1 in the signal data, D0 through D5 with the illumination, the system can deliver output energy from 0 through 63 with the minimum increment of 1. Therefore this system can control the output in 64 levels of light energy and can achieve the grayscale of 64.

While the mirror is always ON with all the incoming data bits are 1 during all the bit durations, the output light energy will be 63 times the energy reflected by a mirror during one Bit Time. Therefore the average output light energy per Bit Time will be 63/63=1 or 100%. This system can deliver all possible light energy received from the light sources.

In spite of the advantage of brightness, the required speed of data transfer is very high. For an example, an 8 bit grayscale is common with HD-TV format which has 1920 horizontal dots with 1080 lines vertically. At 8 bit grayscale, the "Bit Time" will be 1/(60×3×256) seconds or about 20 micro-seconds. This requires the system to transfer 1920×1080 bits per "Bit Time" or about 20 micro-seconds. This equates to about 95.6 Giga bits per second. This speed is not easy to achieve even with the latest technology without costly circuit.

Outline of Light Width Grayscale Control (LWGC)

One embodiment of Light Width Grayscale Control is disclosed in U.S. Pat. No. 5,903,323, wherein the concept of LWGC is explained well.

FIG. 4A shows an example of LWGC, wherein the bit duration for each bit at the SLM is equal and the time width of illumination has the time duration of $1/2^{(5-n)}$ of the Bit Time for the data bit Dn. The same characteristics of "Light Width Grayscale Control" method are shown in FIG. 4B. The maximum output of light energy will be obtained when all the signal bits are 1 and the total output energy in a frame will be 1.96875 out of 6 Bit Times. Therefore the average output energy per Bit Time will be 1.96875/6=0.328. This means that the maximum output light energy at all the incoming signal bits of 1, or simply "the brightness" of Light Width Grayscale Control is 32.8% of "Time Domain Grayscale Control" if a same light source is used. The maximum number of brightness levels or the grayscale will be 64 which is the same as that of "Time Domain Grayscale Control". The grayscale is same as that of "Time Domain Grayscale Control". On the other hand, the speed required to transfer the signal bits is much less and the Bit Time will be a frame period, 1/(60×3) seconds, divided by 8 or about 694 micro-seconds, if 8 bit grayscale is used. This equates to about 3 Giga bits per second, which is far less than 95.5 Giga bits per second of Time Domain Grayscale Control.

Outline of Light Intensity Grayscale Control (LIGC)

One embodiment of Light Width Grayscale Control is disclosed in U.S. Pat. No. 6,232,963, wherein the concept of LIGC is explained.

"Light Intensity Grayscale Control" method is shown in FIG. 5. The characteristics are almost same as those of "Light Width Grayscale Control". The brightness of "Light Intensity Grayscale Control" is about 32.8% of "Time Domain Grayscale Control", if a same light source is used. The grayscale is the same as that of "Time Domain Grayscale Control". The speed required to transfer data to the SLM is the same as that of "Light Width Grayscale Control". The advantage of LIGC is the required speed to control the light source is less than that of LWGC. As shown, both LWGC and LIGC are attractive for slower data transfer circuits, but the loss of the brightness is significant and loses as much as ⅔ of the available brightness.

With the above background descriptions, the following discussion further explain the limitations and technical difficulties of the conventional technologies.

Referring to FIG. 1A for an image display system 1 including a screen 2 is disclosed in a reference U.S. Pat. No. 5,214, 420. A light source 10 is used for generating light energy for illuminating the screen 2. The generated light 9 is further collimated and directed toward a lens 12 by a mirror 11. Lenses 12, 13 and 14 constitute a beam collimator to collimate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 32 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C shows an exemplary control circuit for controlling a mirror element according to the disclosures made in U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based of a Static Random Access Switch Memory (SRAM) design. The transistor M9 connected to a Row-line receives a DATA signal via a Bit-line. The memory cell 32 written data is accessed when the transistor M9, which has received the ROW signal on a Word-line is turned on. The latch 32a includes two cross-coupled inverters, i.e., M5/M6 and M7/M8, which permit two stable states, that is, a state 1 is Node A high and Node B low, and a state 2 is Node A low and Node B high. The control circuit as illustrated in FIG. 1C controls the micromirrors to switch between two states and the control circuit drives the mirror to oscillate to either an ON or OFF deflected angle (or position) as shown in FIG. 1A.

The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

As illustrated in FIG. 2A, when adjacent image pixels are displayed with a brightness controlled by very coarse gray scales, the adjacent pixels may be displayed with great differences of quantity of light, thus, artifacts are shown between these adjacent image pixels. That leads to the degradations of display image qualities. The degradations of image qualities are specially pronounced in the bright areas of image when there are "bigger gaps" of gray scale, i.e. quantity of light, between adjacent image pixels. For example, the bright areas are generally observed on the forehead, the sides of the nose and the upper arm in an image of human and there are artifacts shown in these bright areas when displayed with gray scales of coarse resolutions. The artifacts are caused by a technical limitation that the digitally controlled image does not obtain sufficient number of the gray scale, i.e. the levels of the quantity of light. At the bright spots of display, e.g., the forehead, the sides of the nose and the upper arm, the adjacent pixels are displayed with visible gaps of light intensities. When the levels of gray scales are increased, the image degradation is significantly reduced even with only twice more levels of gray scales as illustrated in FIG. 2B.

Therefore, when the mirrors are controlled to operate at either ON or OFF position then the adjustable quantity of light of a displayed image is controlled by the length of time each mirror is held at the ON position. In order to increase the number of the levels of the controllable quantity of light, the switching speed of the ON and OFF positions for the mirror must be increased. A higher number of bits is therefore required to control the ON and OFF states of the micromirrors. However, when the switching speed of the mirror deflection is increased, a stronger hinge for supporting the mirror is necessary to sustain a required number of switches of the ON and OFF positions for the mirror deflection. Furthermore, in order to drive the mirrors provided strengthened hinge toward the ON or OFF positions, it becomes necessary to apply a higher voltage to the electrode. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of higher number of the gray scales, a more complicated production process and larger device areas are required to produce the DMOS mirror. Conventional mirror controls are therefore faced with a technical problem that higher level of gray scales and can only be achieved by operating the micromirrors at a range of higher voltage to maintain the benefits of manufacturing a smaller image display apparatus.

There are many patents related to the control of quantity of light. These patents include U.S. Pat. Nos. 5,589,852, 5,617, 243, 5,668,611, 5,706,061, 5,903,323, 6,232,963, 6,262,829, 6,592,227, 6,648,476, 6,819,064, and 6,975,366. There are further patents and patent applications related to different sorts of light sources. These patents include U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties. Therefore, a need still exists in the art of image display systems applying digital control of a micromirror array as a spatial light modulator to provide new and improved systems such that the above-discussed difficulties can be resolved. The major difficulty that hinders the increase of the gray scales of image display is caused by the ON-OFF control scheme of the conventional systems that limits the minimum ON time to adjust the brightness of a display image. The minimum ON time determines the height of the steps of gray scale in FIG. 2. There is no way to provide the adjustable brightness that is lower than the step by controlling the micromirrors. In order to overcome the problems of the degradation of picture quality it is necessary to increase the level of adjustable brightness with adjustable brightness lower than the step shown in FIG. 2.

There is an increasing demand for an image display system to display image with higher image quality. One of the determining factors for displaying an image with improved image quality is to increase the pixel resolution such as in a high definition (HD) display system a HD-level (1920×1080) high resolution is gaining popularity. However, another important factor for improving the image quality is to increase the level of gray scales and as of now most of image display systems still use an 8-bit display mode (8 bits for each of RGB colors, for example). In order to improve the image display quality, it is foreseeable that in the near future, it is desirable and necessary that an image display system uses a greater number of gray scales, for example, gray scales controlled by digital word 10 bits or more.

A micromirror device is implemented as a display system for wide screen image display configured either as a front projector or a rear-projection TV. A micro-mirror device as now implemented in the display systems deflects the illumination light in two directions, ON and OFF. Several types of grayscale control methods are proposed as illustrated in FIG. 3A, FIG. 4A and FIG. 5. The most commonly used PWM is illustrated in FIG. 3A, wherein the time duration of the signal bit (D0 through D5) is proportional to 2" and the intensity of illumination stays same. Because some other grayscale control methods will be discussed here, the conventional PWM described above will be referred to as "Time Domain Grayscale Control". Another proposed method is "Light Width Grayscale Control" by varying the pulse width of light and keeping the time duration of signal bits constant and shown in FIG. 4A. The third method proposed is "Light Intensity Grayscale Control" by varying the intensity of light and keeping the time duration of signal bits constant and shown in FIG. 5.

Each method has advantages and disadvantages. The important characteristics of "Time Domain Grayscale Control" are shown in FIG. 3B. The time duration of a frame is 63 times the "minimum controllable time" of SLM (hereafter "Bit Time"). The maximum output of light energy will be obtained when all the signal bits are 1 and the total output energy in a frame will be 63 units of the light intensity of 1 multiplied by Bit Duration as shown in FIG. 3B. Therefore the average output energy per Bit Time will be 63/63=1. The maximum number of brightness levels will be 64 including 0 through 63, in other words, the grayscale is 64. This method is required to send at least one bit of signal to each of pixel in the entire pixel array in one Bit Time (the minimum controllable time of SLM). For example, nowadays 8 bit grayscale is common with HD-TV format which has 1920 horizontal dots with 1080 lines vertically. At 8 bit grayscale, the "Bit Time" will be 1/(60×3×256) seconds or about 20 micro-seconds. This requires the system to transfer 1920×1080 bits per "Bit Time" or about 20 micro-seconds. This equates to about 95.6 Giga bits per second. This speed is not easy to achieve even with the latest technology without costly circuit.

The same characteristics of "Light Width Grayscale Control" method are shown in FIG. 4B. The maximum output of light energy will be obtained when all the signal bits are 1 and the total output energy in a frame will be 1.96875 out of 6 Bit Times. Therefore the average output energy per Bit Time will be 1.96875/6=0.328. This means that the maximum output light energy at all the incoming signal bits of 1, or simply "the brightness" of Light Width Grayscale Control is 32.8% of "Time Domain Grayscale Control" if a same light source is used. The maximum number of brightness levels or the grayscale will be 64 which is the same as that of "Time Domain Grayscale Control". The grayscale is same as that of "Time Domain Grayscale Control". On the other hand, the speed required to transfer the signal bits is much less and the Bit Time will be a frame period, 1/(60×3) seconds, divided by 8 or about 694 micro-seconds, if 8 bit grayscale is used. This equates to about 3 Giga bits per second, which is far less than 95.5 Giga bits per second of Time Domain Grayscale Control.

"Light Intensity Grayscale Control" method is shown in FIG. 5. The characteristics are almost same as those of "Light Width Grayscale Control". The brightness of "Light Intensity Grayscale Control" is about 32.8% or less of "Time Domain Grayscale Control", if a same light source is used. The grayscale is same as that of "Time Domain Grayscale Control". The speed required to transfer data is same as that of "Light Width Grayscale Control".

With these comparisons among the three methods, obviously "Time Domain Grayscale Control" has an advantage in brightness and it is about 3 times brighter than the other two methods, if a same light source is used. On the other hand, it requires substantially higher data transfer speed than the other two methods. The consumers obviously chose brighter TVs rather than inexpensive TVs and Time Domain Grayscale Control became an industry standard.

However, the present technology does not allow inexpensively higher level of grayscale using Time Domain Grayscale Control than 8 bits. In spite of the technological limitation, the market is moving toward much higher level of grayscale. The grayscale of DVD is 8 bits, but newly introduced "Blue-ray" disc has 16 bit grayscale which provides much smoother pictures. There is a need for substantially higher level of grayscale which can be achieved in an inexpensive way.

SUMMARY OF THE INVENTION

It is an aspect of the present invention to disclose improved configuration and control methods to provide a display system that implements a digitally controlled SLM to achieve display images with a 16 bit grayscale without cost penalty and without sacrificing brightness.

In view of achieving the image display quality with a 16-bit grayscale, it is an aspect of the present invention is to provide an image display system using a spatial light modulator (SLM), such as a micro-mirror device, to display an image with a greater number of gray scales without requiring the SLM to operate at an excessively fast speed with increased number of repetitive operations of the SLM and without sacrificing brightness as much as "Light Intensity Grayscale Control" or "Light Width Grayscale Control" such that the above discussed problems and limitations can be resolved.

The image display system according to one aspect of the invention includes an illumination light projected from a light source controlled by a light source control unit to adjust the illumination intensity and/or light emission time of the illumination light as a combination of Time Domain Grayscale Control (hereafter TDGC) and Light Intensity Grayscale Control (hereafter LIGC) and/or Light Width Grayscale (hereafter LWGC) so as to maximize the levels of grayscale and minimizing the loss of illumination light energy by the maximum utilization of TDGC as much as the Bit Time (the minimum controllable time of SLM) allows and the utilization of LIGS or LWGC for the rest of the least significant data bits.

It is another aspect of the present invention when the light source controller does not have enough high speed driving capability, twice longer time slice can be used than Bit Time to repeat and vary the intensity of light source. Although the loss of light energy will increase compared with the case using Bit Time, the requirement of circuit will be reduced.

As shown above, this invention can provide significantly higher grayscale with almost same brightness and the same data transfer speed compared with the conventional PWM.

BRIEF DESCRIPTION OF THE DRAWINGS

FIG. 2A shows an example of lower gray scales.

FIG. 2B shows an example of higher gray scales.

FIG. 11B is a table showing bit duration, light intensity and output energy for corresponding signal bits of FIG. 11A implementing 10 bit grayscale using 6 bit equivalent data transfer speed to that of TDGC.

FIG. 11C is a table showing bit duration, light intensity and output energy for corresponding signal bits implementing MBGC with 10 bit grayscale using 6 bit equivalent data transfer speed to TDGC.

DESCRIPTION OF THE PREFERRED EMBODIMENTS

Reference is now made to the above listed Figures for the purpose of describing, in detail, the preferred embodiments of the present invention. The Figures referred to and the accompanying descriptions are provided only as examples of the invention and are not intended in anyway to limit the scope of the claims appended to the detailed description of the embodiment.

Outline of Projection Display System

The following detail description is provided for an exemplary embodiment of the present invention by referring to the accompanying drawings.

Figure 1A:
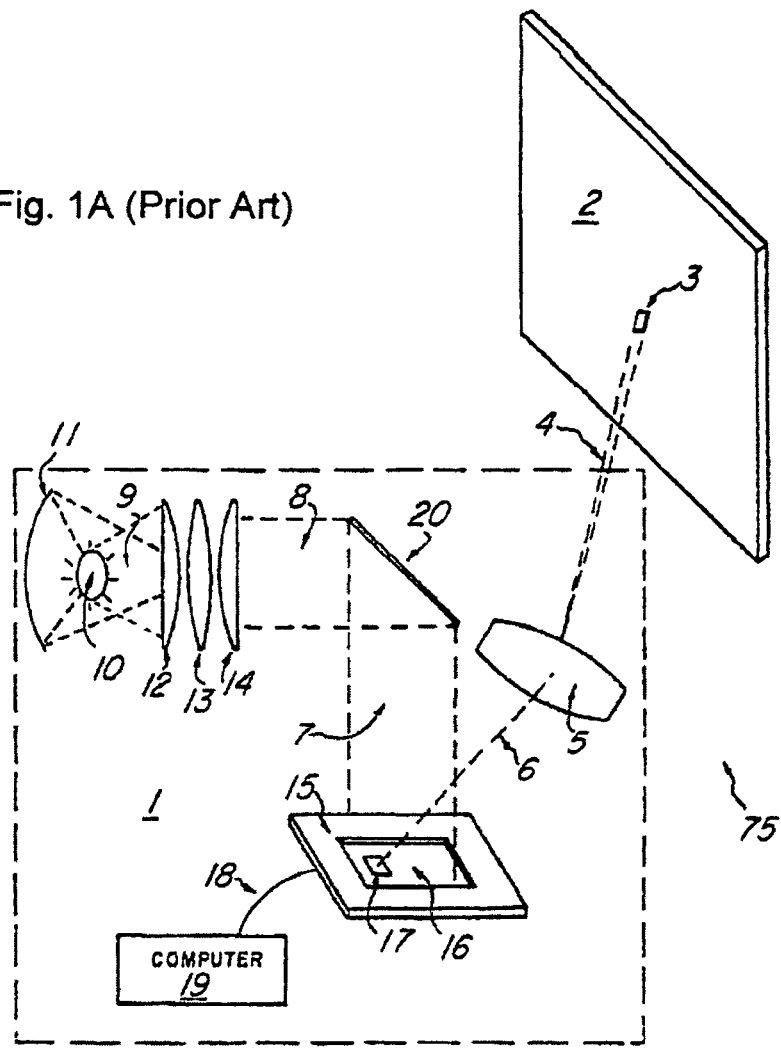
FIGS. 1A and 1B are functional block diagram and a top view of a portion of a micromirror array implemented as a spatial light modulator for a digital video display system of a conventional display system disclosed in a prior art patent.
Figure 1B:
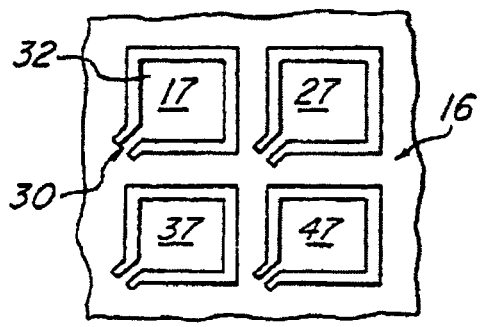
Figure 1C:
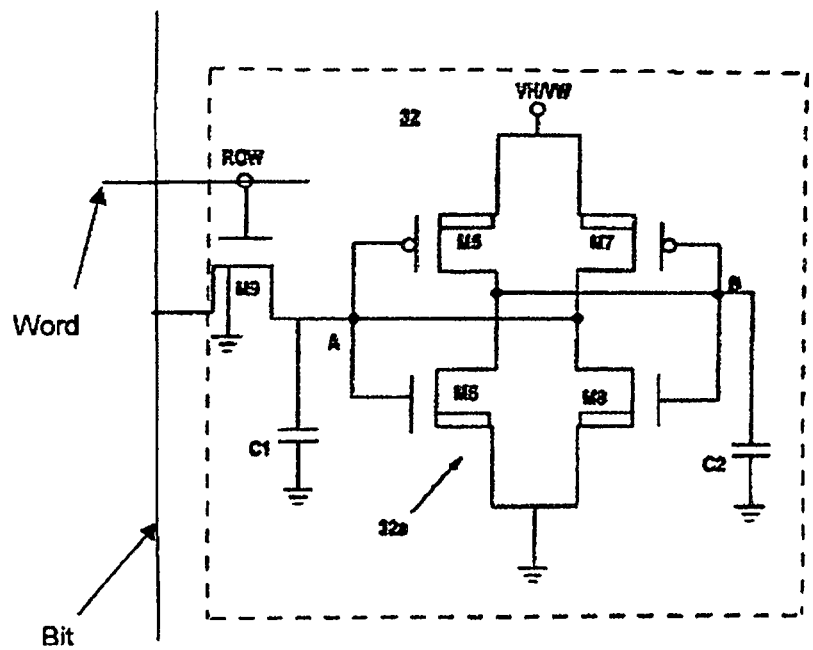
FIG. 1C is a circuit diagram for showing a prior art circuit for controlling a micromirror to position at an ON and/or OFF states of a spatial light modulator.
Figure 1D:
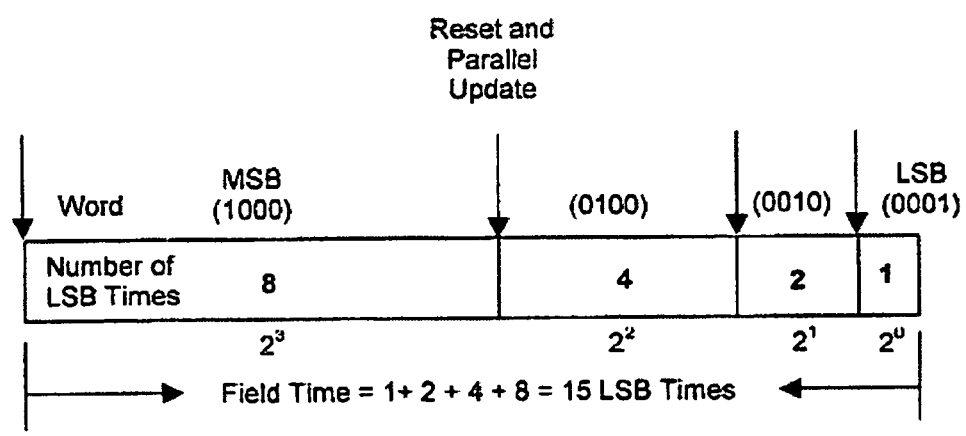
FIG. 1D is diagram for showing the binary time intervals for a four bit gray scale.
Figures 3A, 3B:
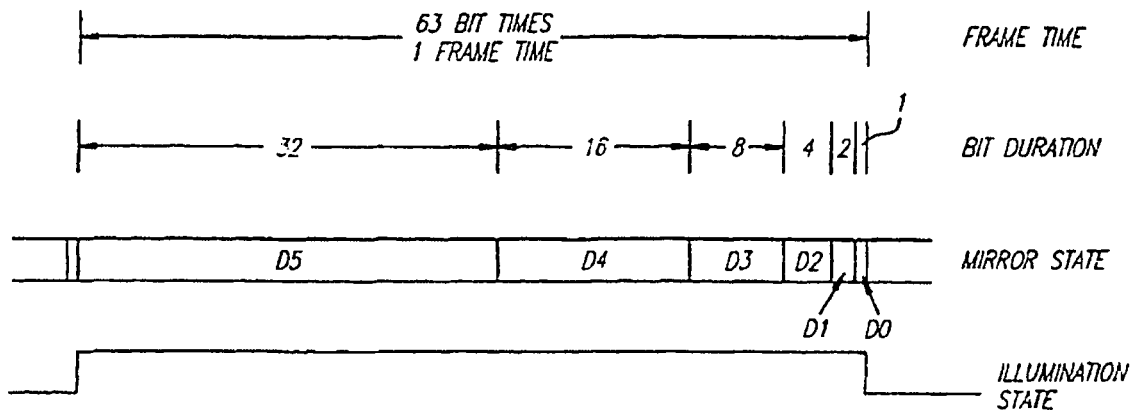
FIG. 3A shows an example of a prior art of Time Domain Grayscale Control or TDGC and the time chart for the incoming signal bits, light illumination and bit duration.
FIG. 3B is a table showing bit duration, light intensity and output energy for corresponding signal bits of TDGC.
Figures 4A, 4B:
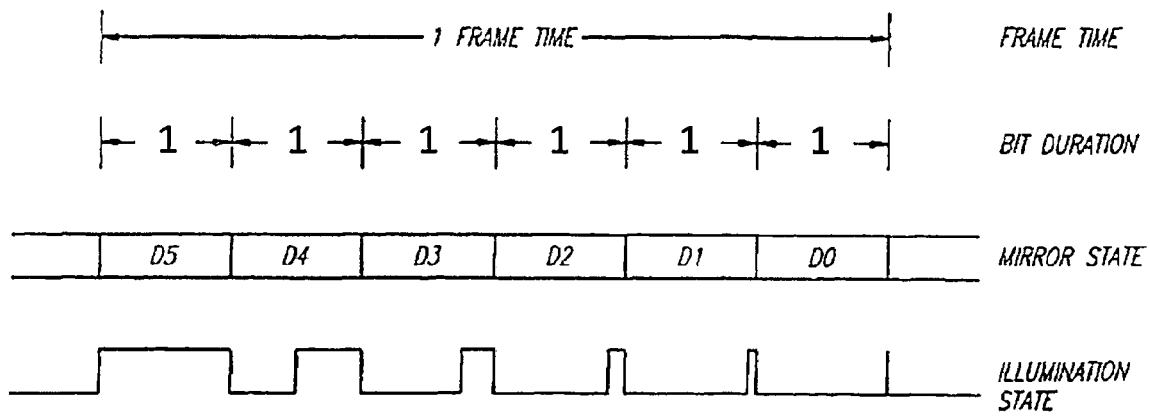
FIG. 4A shows an example of a prior art of Light Width Grayscale Control, or LWGC, and the time chart for incoming signal bits, light illumination and bit duration.
FIG. 4B is a table showing bit duration, light intensity and output energy for corresponding signal bits of LWGC.
Figure 5:
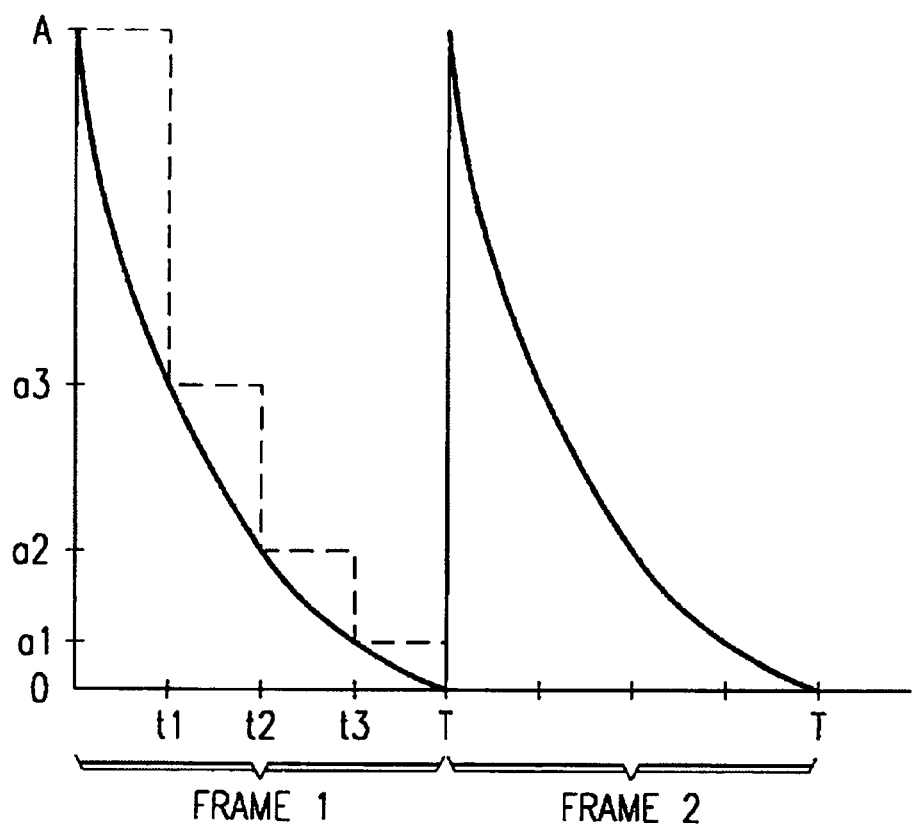
FIG. 5 shows an example of a prior art of "Light Intensity Grayscale Control" or LIGC and the time chart for light illumination and bit duration.
Figure 6:
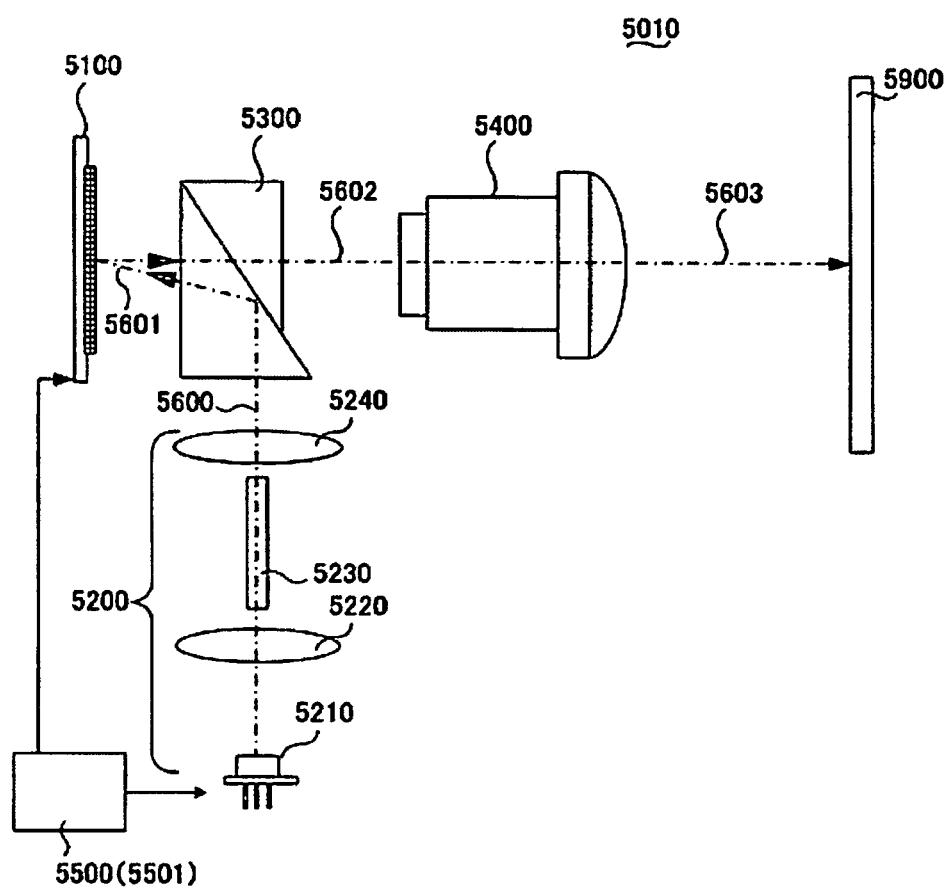
FIG. 6 is a functional block diagram for showing the configuration of a projection apparatus according to the preferred embodiment of the present invention.

FIG. 6 is a functional block diagram for showing the configuration of a projection apparatus according to a preferred embodiment of the present invention.

FIG. 6 shows a projection apparatus 5010 according to the present embodiment comprises a single spatial light modulator (SLM) 5100, a control unit 5500, a Total Internal Reflection (TIR) prism 5300, a projection optical system 5400, and a light source optical system 5200.

The projection apparatus 5010 is a commonly referred to as a single-panel projection apparatus comprising a single spatial light modulator 5100.

The projection optical system 5400 includes the spatial light modulator 5100 and a TIR prism 5300 disposed on the optical axis of the projection optical system 5400, and the light source optical system 5200 is disposed for projecting a light along the optical axis matches with the optical path of the projection optical system 5400.

The TIR prism 5300 receives the incoming illumination light 5600 projects from the light source optical system 5200 and directs the light to transmit as incident light 5601 to the spatial light modulator 5100 at a prescribed inclination angle. The SLM 5100 further reflects and transmits the reflection light 5602, towards the projection optical system 5400. The projection optical system 5400 receives the light 5602 reflected from the SLM 5100 onto a screen 5900 as projection light 5603. The light source optical system 5200 comprises a variable light source 5210 for generating the illumination light 5600, a condenser lens 5220 for focusing the illumination light 5600, a rod type condenser body 5230, and a condenser lens 5240.

The variable light source 5210, condenser lens 5220, rod type condenser body 5230, and condenser lens 5240 are placed in the aforementioned order on the optical axis of illumination light 5600 emitted from the variable light source 5210 and incident to the side face of the TIR prism 5300.

The projection apparatus 5010 employs a single spatial light modulator 5100 for projecting a color display on the screen 5900 by applying a sequential color display method. Specifically, the variable light source 5210 comprises a red laser light source 5211, a green laser light source 5212 and a blue laser light source 5213 (not specifically shown here). The variable light source allows independent controls for the light emission states. The controller of the variable light source performs an operation of dividing one frame of display data into a plurality of sub-fields (i.e., three sub-fields, that is, red (R), green (G) and blue (B) in the present case) and turns on each of the red laser light source 5211, green laser light source 5212 and blue laser light source 5213 to emit each respective light in time series at the time band corresponding to the sub-field of each color as will be described later. In an exemplary embodiment, the light sources are laser light sources. In alternate embodiment, the light sources may also be semiconductor light sources such as the light emitting diodes (LEDs).

Figure 7:
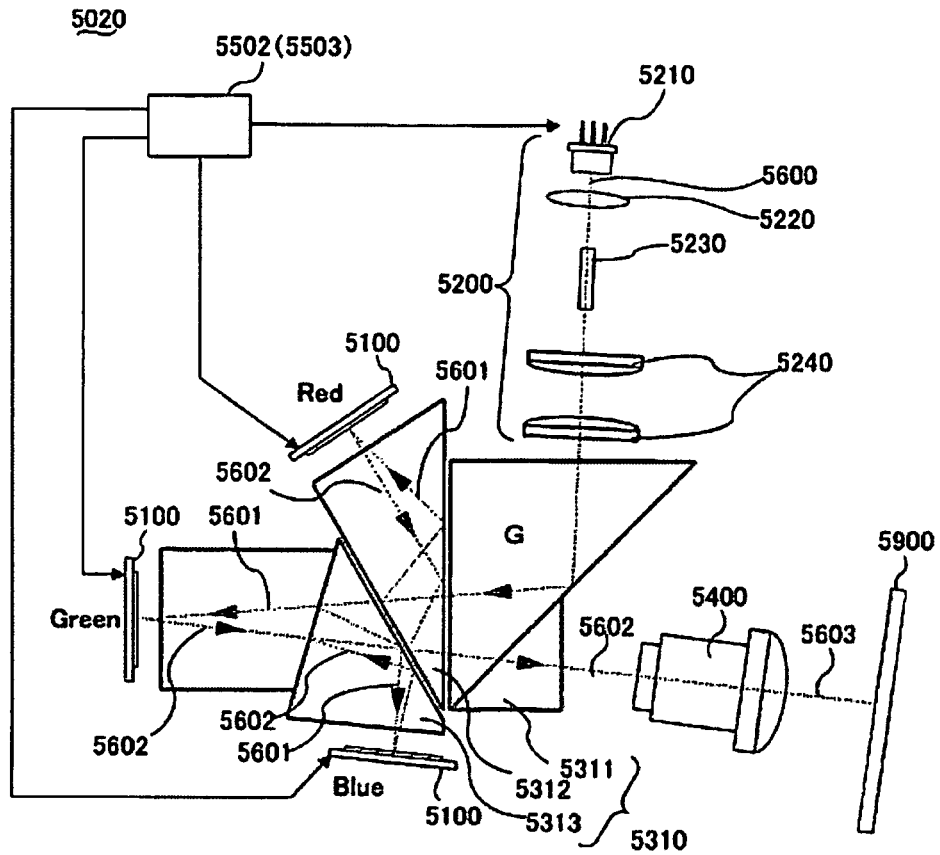
FIG. 7 is a functional block diagram for showing the configuration of a multi-panel projection apparatus according to another preferred embodiment of the present invention.

FIG. 7 is a functional block diagram for showing the configuration of a projection apparatus according to an alternate preferred embodiment of the present invention.

The projection apparatus 5020 is commonly referred to as a multiple-plate projection apparatus that includes a plurality of spatial light modulators 5100 instead of a single SLM included in the single-panel projection apparatus 5010 described earlier. Furthermore, the projection apparatus 5020 comprises a control unit 5502 in place of the control unit 5500.

The projection apparatus 5020 comprises multiple spatial light modulators 5100 further includes a light separation/synthesis optical system 5310 between the projection optical system 5400 and each of the spatial light modulators 5100.

The light separation/synthesis optical system 5310 comprises multiple TIR prisms, i.e., a TIR prism 5311, a prism 5312, and a prism 5313.

The TIR prism 5311 directs the illumination light 5600 incidents from the side of the optical axis of the projection optical system 5400 to the spatial light modulator 5100 as incident light 5601.

The TIR prism 5311 carries out the function of directing the illumination light 5600 projected along the optical axis of the projection optical system 5400 and directs the light to the spatial light modulator 5100 as incident light 5601. The TIR prism 5312 carries out the function of separating red (R) light from an incident light 5601, projected by way of the TIR prism 5311, to transmit the red light to the spatial light modulators for the red light 5100, and further carries out the function of directing the reflection light 5602 of the red light to the TIR prism 5311.

Likewise, the prism 5313 carries out the functions of separating blue (B) and green (G) lights from the incident light 5601 projected by way of the TIR prism 5311, and directs the light to the blue color-use spatial light modulators 5100 and green color-use spatial light modulators 5100, and further carries out the function of directing the reflection light 5602 of the green light and blue light to the TIR prism 5311.

Therefore, the spatial light modulations of these three colors, R, G and B carry out these functions simultaneously by these three spatial light modulators 5100. The reflection light 5602, resulting from the respective modulations, is projected onto the screen 5900 as the projection light 5603 by way of the projection optical system 5400, and thus a color display is achieved.

Note that the system may implement various modifications by using a light separation/synthesis optical system instead of the light separation/synthesis optical system 5310 described above.

Figure 8A:
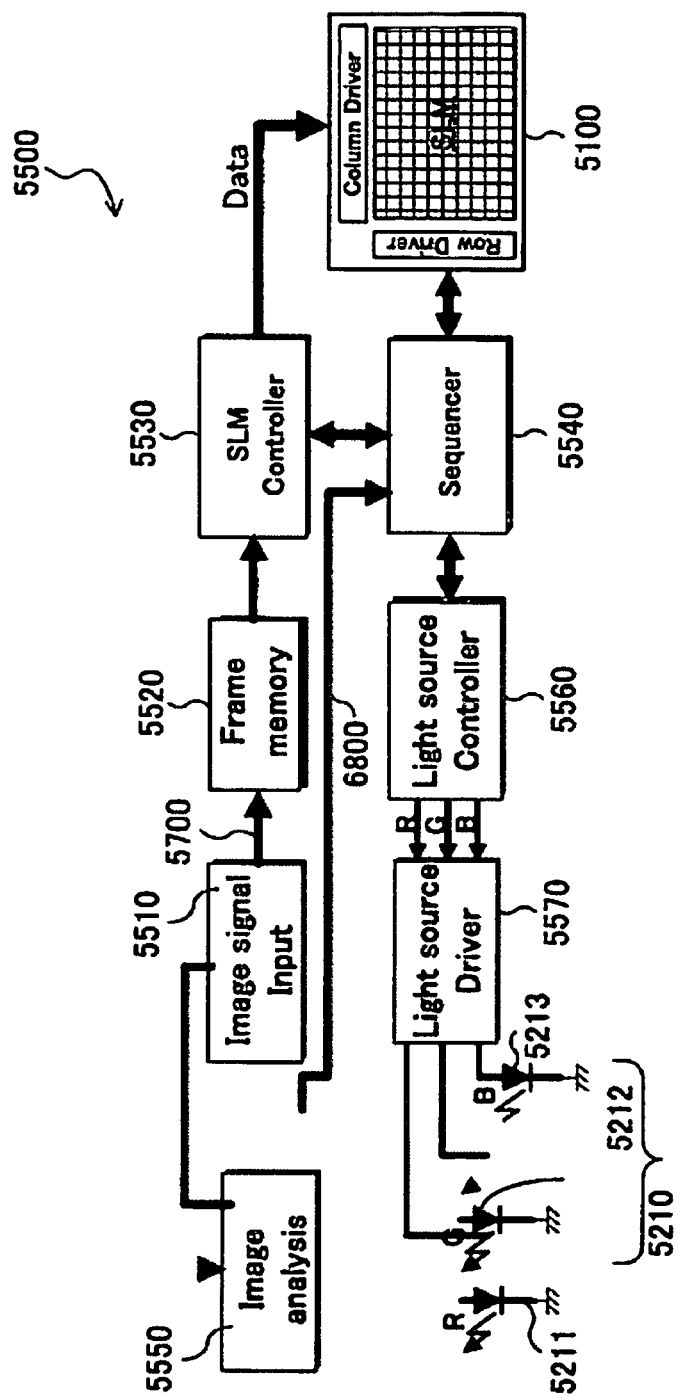
FIG. 8A is a block diagram showing a control unit for a single-panel projection apparatus according to the preferred embodiment of the present invention.

FIG. 8A is a functional block diagram for illustrating the configuration of the control unit 5500 for the above described single-panel projection apparatus 5010. The control unit 5500 comprises a frame memory 5520, an SLM controller 5530, a sequencer 5540, a light source control unit 5560, and a light source drive circuit 5570.

The sequencer 5540, includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 from the frame memory 5520 as described later. The SLM controller separates the data read from the memory 5520 into a plurality of sub-fields according to detail descriptions further describe below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 synchronously with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls the light source drive circuit 5570 to control the operation of the variable light source 5210 by using a light source profile control signal in emitting the illumination light 5600 The light source profile control signal is generated from the image analysis signal 5800 on the basis of the input of the image analysis signal 5800 generated by the video image analysis unit 5550 using data of the light source pulse patterns generated by the sequencer 5540 as will be further described below.

The light source drive circuit 5570 drives the red laser light source 5211, green laser light source 5212, and blue laser light source 5213 of the variable light source 5210 to emit light, respectively. The light source generates the light source pulse patterns 5801 through 5811 (which are described later) received from the light source control unit 5560.

Figure 8B:
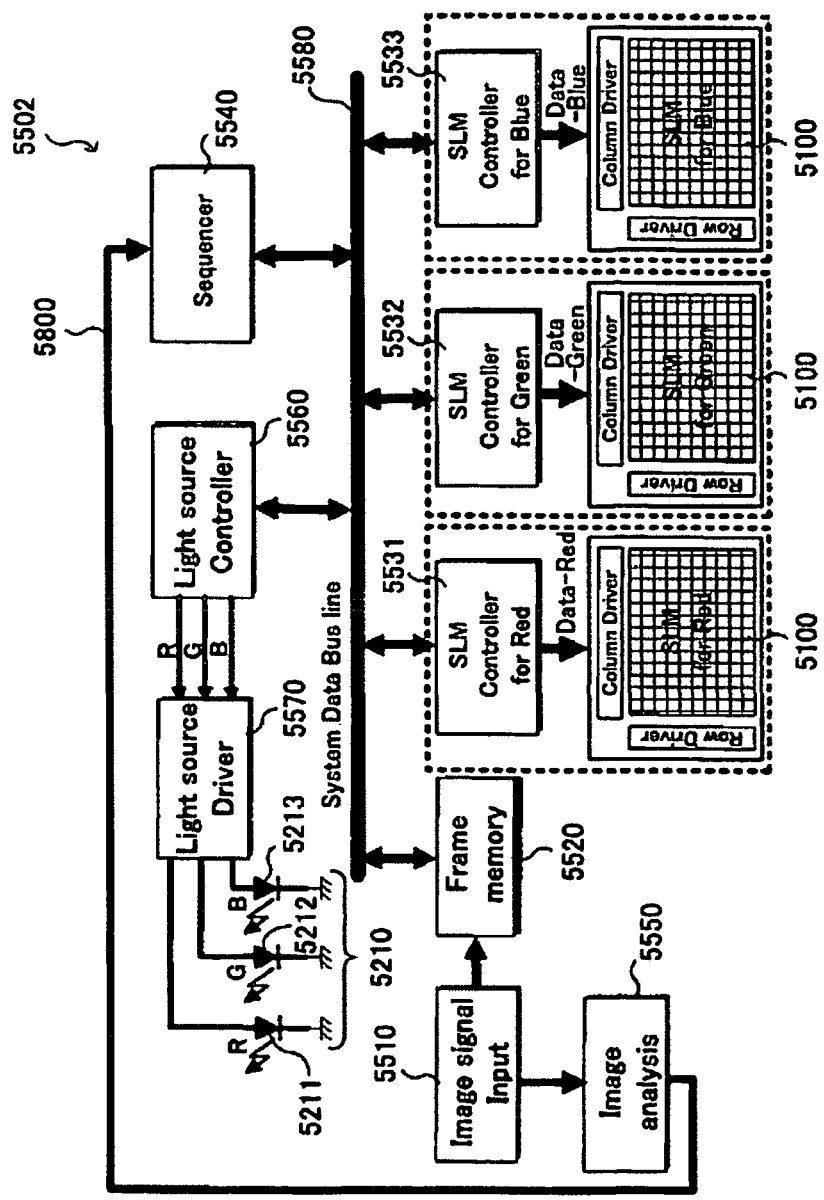
FIG. 8B is a block diagram for showing the configuration of the control unit of a multi-panel projection apparatus according to the preferred embodiment of the present invention.

FIG. 8B is a functional block diagram for illustrating the configuration of the control unit of a multi-panel projection apparatus according to the present embodiment.

The control unit 5502 comprises a plurality of SLM controllers 5531,5532 and 5533, which are used for controlling each of the spatial light modulators 5100. Each of these modulators is implemented for modulating the respective colors R, G and B, and the configuration of the controllers is the main difference between the control unit 5502 and the control unit 5500 described in FIG. 8A. Specifically, each of the SLM controller 5531, SLM controller 5532 and SLM controller 5533, is implemented to process the modulation of a respective colors Red, Green, and Blue.

Furthermore, a system bus 5580 is used for connecting the frame memory 5520, light source control unit 5560, sequencer 5540, and SLM controllers 5531 through 5533, in order to speed up and streamline the connection path of each connecting element.

Figure 9:
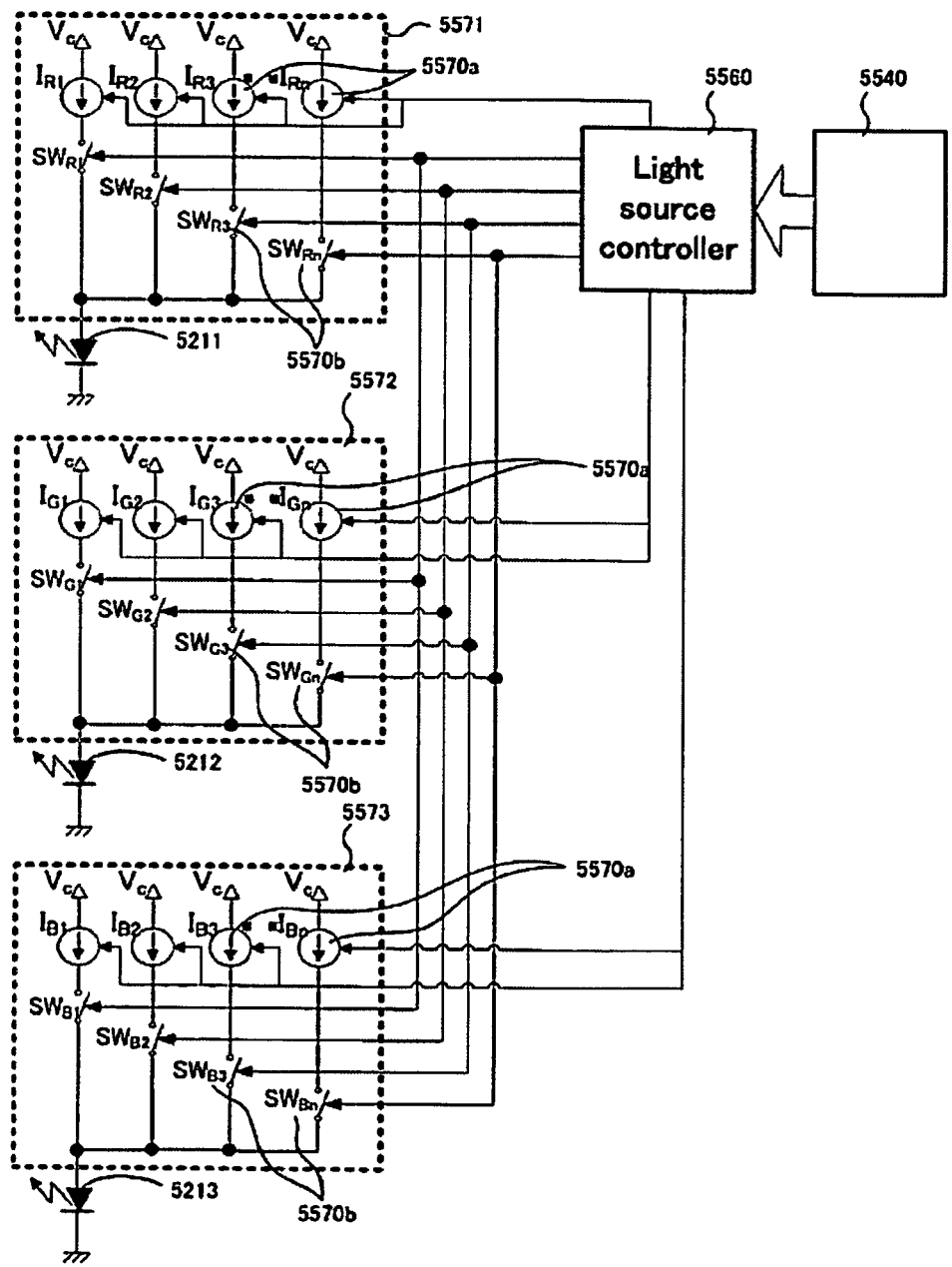
FIG. 9 is a functional block diagram for showing the configuration of the light source drive circuit of a projection apparatus according to the preferred embodiment of the present invention.

FIG. 9 is a functional block diagram for illustrating the configuration of the light source drive circuit 5570 (i.e., the light source drive circuits 5571, 5572, and 5573) according to the present embodiment.

The light source drive circuit illustrated in FIG. 9 comprises multiple constant current circuits 5570a (i.e., I (R, G, B)1 through I (R, G, B)n) and multiple switching circuits 5570b (i.e., switching circuits SW (R, G, B)1 through SW (R, G, B)n), which correspond to their respective constant current circuits 5570a, in order to generate the desired light intensities of emission PI through P n for the light source optical system 5200 (i.e., the red laser light source 5211, green laser light source 5212, and blue laser light source 5213).

The switching circuit 5570b switches according to the desired emission profile of the light source optical system 5200 (i.e., the red laser light source 5211, green laser light source 5212, and blue laser light source 5213).

The setup values of the output current of the constant current circuits 5570a (i.e., constant current circuits I (R, G, B)n) when the gray scale of the emission intensity of the light source optical system 5200 is designated at N bits (where N≧n), are as follows:

$$I(R,G,B)_1 = I_{th} + LSB$$

$$I(R,G,B)_2 = LSB + 1$$

$$I(R,G,B)_3 = LSB + 2$$

$$\ldots$$

$$\ldots$$

$$I(R,G,B)_n = MSB$$

This illustrates that a gray scale display based on emission intensity; a similar gray scale display is achievable even if the emission period (i.e., an emission pulse width), emission interval (i.e., an emission cycle), and the like, are made to be variable.

The relationship between the emission intensity Pn of the variable light source and drive current for each color in this case is as follows. Note that "k" is an emission efficiency corresponding to the drive current:

$$P_1 = k^*(I_{th} + I_1)$$

$$P_2 = k^*(I_{th} + I_1 + I_2)$$

$$\ldots$$

$$\ldots$$

$$P_n = k^*(I_{th} + I_1 + I_2 + \ldots + I_{n-1} + I_n)$$

Figure 10:
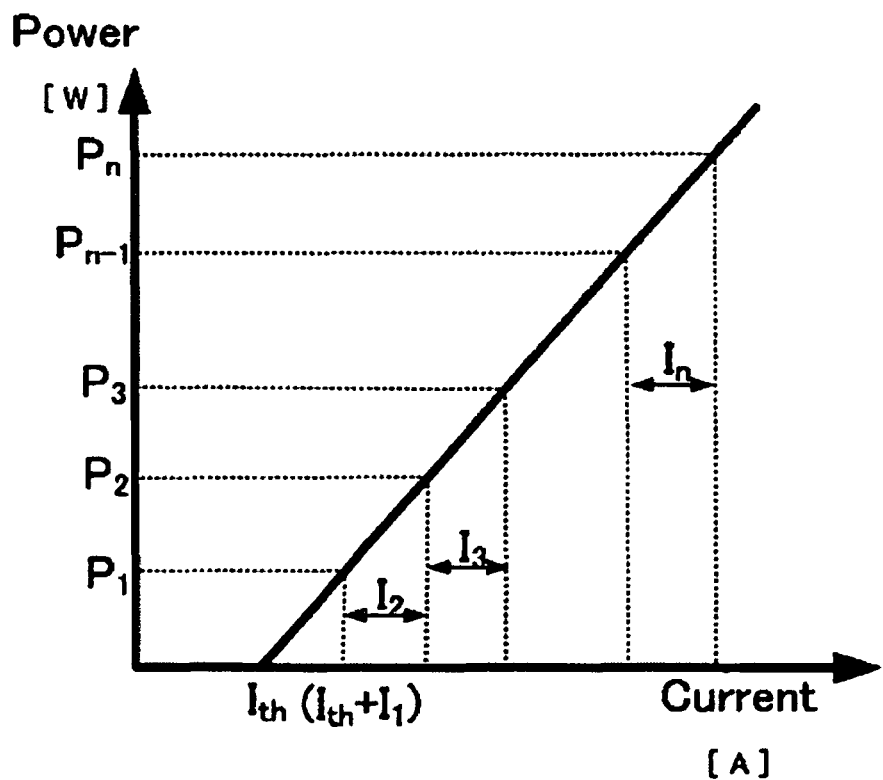
FIG. 10 is a chart showing the relationship between the applied current and the intensity of light emission drive circuit according to the embodiment of the present invention.

FIG. 10 is a chart showing the relationship between the applied current I and emission intensity Pn of the constant current circuit 5570a of the light source drive circuit shown described in FIG. 9.

Note that the description for FIG. 9 illustrates a case of changing the emission profiles of the variable light source for each sub-frame corresponding to each gray scale bit. If the display gray scale function of the spatial light modulator 5100 is used in parallel, the number of required levels of electrical current decreases, enabling a reduction in the numbers of constant current circuits 5570a and switching circuits 5570b. This also makes it possible to obtain a number of gray scales equal to, or higher than, the gray scales of spatial light modulator 5100.

Figure 11A:
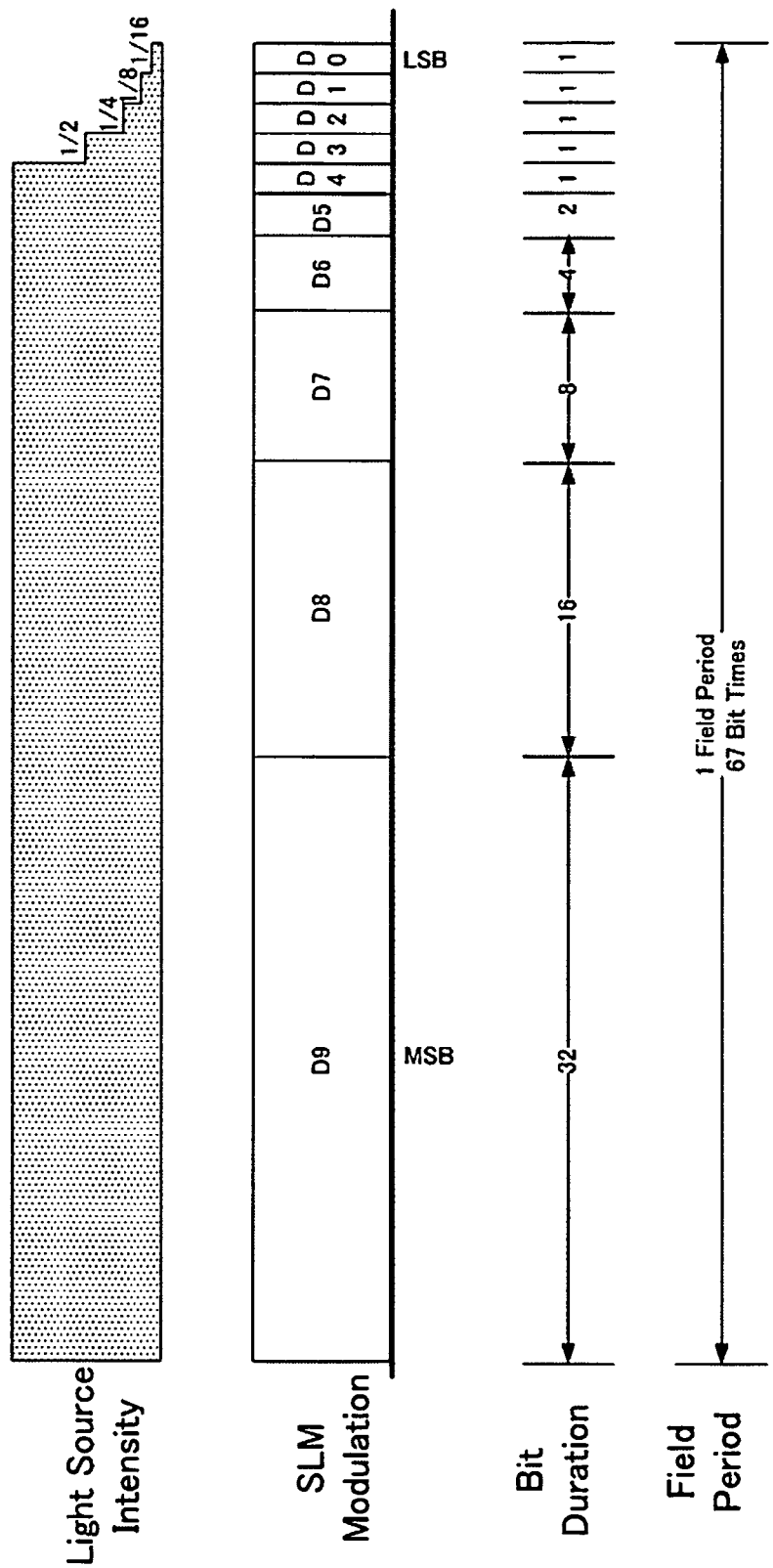
FIG. 11A shows an example of an embodiment of the present invention, Multi Bit Time Grayscale or MBGC, with the time chart for incoming signal bits, light illumination and bit duration.

FIG. 11A, FIG. 11B and FIG. 11C exemplify the embodiments of this invention. In FIG. 11A, illustrates an example of 10 bit grayscale representation with the most significant 6 bits are controlled by TDGC and the least significant 4 bits are controlled by LIGC. The characteristics of this system are illustrated in FIG. 11B. The brightness (defined as the maximum output of light energy with all the incoming bits of 1) of this system will be 63.9375/67=0.95429. This means that the loss of light is 4.571% compared with TDGC. Another example of the embodiment of this invention is illustrated in FIG. 11C, wherein the incoming signal data contains 16 bits of grayscale and the most significant 8 bits are controlled by TDGC and the least significant 8 bits are controlled by LIGC. The grayscale of the system will be 16 bits or 65535 levels of brightness incremental steps. The brightness of the system will be 255.9960938/263=0.97337. This means that the loss of light will be 2.663 percent compared with TDGC. This system will provide the long desired high grayscale with the minimum loss of brightness. This new method will be referred to as "Multi Bit-Time Grayscale Control" or "MBGC" hereafter. MBGC with 16 bit grayscale can have the same Bit Time (the minimum controllable time of SLM) as that of TDGC with 8 bit grayscale and can have 97% of the brightness of TDGC.

Outline of Multi-Bit Time Grayscale Control (MBGC)

MBGS is proposed in this invention which can increase grayscale substantially without losing light as much as LWGC and LIGC and still maintain slower speed of data transfer than TDGC. FIG. 11A shows an example of an embodiment of this invention, Multi-Bit Time Grayscale Control or MBGC. FIG. 11A illustrates an example of 10 bit grayscale representation with the most significant 6 bits are controlled by TDGC and the least significant 4 bits are controlled by LIGC repeating Bit Time (the minimum controllable time of SLM) 5 times with varied light intensity (D0 through D4). The characteristics of this system are illustrated in FIG. 11B. The brightness (defined as the maximum output of light energy with all the incoming bits of 1) of this system will be 63.9375/67=0.95429. This means that the loss of light is 4.571% compared with TDGC. Another example of the embodiment of this invention is illustrated in FIG. 11C, wherein the incoming signal data contains 16 bits of grayscale and the most significant 8 bits are controlled by TDGC and the least significant 8 bits are controlled by LIGC using 8 Bit Times with varied light source intensities. The grayscale of the system will be 16 bits or 65535 levels of brightness incremental steps. The brightness of the system will be 255.9960938/263=0.97337. This means that the loss of light will be 2.663 percent compared with TDGC. This system will provide the long desired high grayscale with the minimum loss of brightness. This new method will be referred to as "Multi Bit-Time Grayscale Control" or "MBGC" hereafter. MBGC with 16 bit grayscale can have the same Bit Time (the minimum controllable time of SLM) as that of TDGC with 8 bit grayscale and can have 97% of the brightness of TDGC.

FIG. 11A, FIG. 11B and FIG. 11C exemplify the embodiments of this invention. In FIG. 11A, illustrates an example of 10 bit grayscale representation with the most significant 6 bits are controlled by TDGC and the least significant 4 bits are controlled by LIGC. The characteristics of this system are illustrated in FIG. 11B. The brightness (defined as the maximum output of light energy with all the incoming bits of 1) of this system will be 63.9375/67=0.95429. This means that the loss of light is 4.571% compared with TDGC. Another example of the embodiment of this invention is illustrated in FIG. 11C, wherein the incoming signal data contains 16 bits of grayscale and the most significant 8 bits are controlled by TDGC and the least significant 8 bits are controlled by LIGC. The grayscale of the system will be 16 bits or 65535 levels of brightness incremental steps. The brightness of the system will be 255.9960938/263=0.97337. This means that the loss of light will be 2.663 percent compared with TDGC. This system will provide the long desired high grayscale with the minimum loss of brightness. This new method will be referred to as "Multi Bit-Time Grayscale Control" or "MBGC" hereafter. MBGC with 16 bit grayscale can have the same Bit Time (the minimum controllable time of SLM) as that of TDGC with 8 bit grayscale and can have 97% of the brightness of TDGC.

Figure 12:
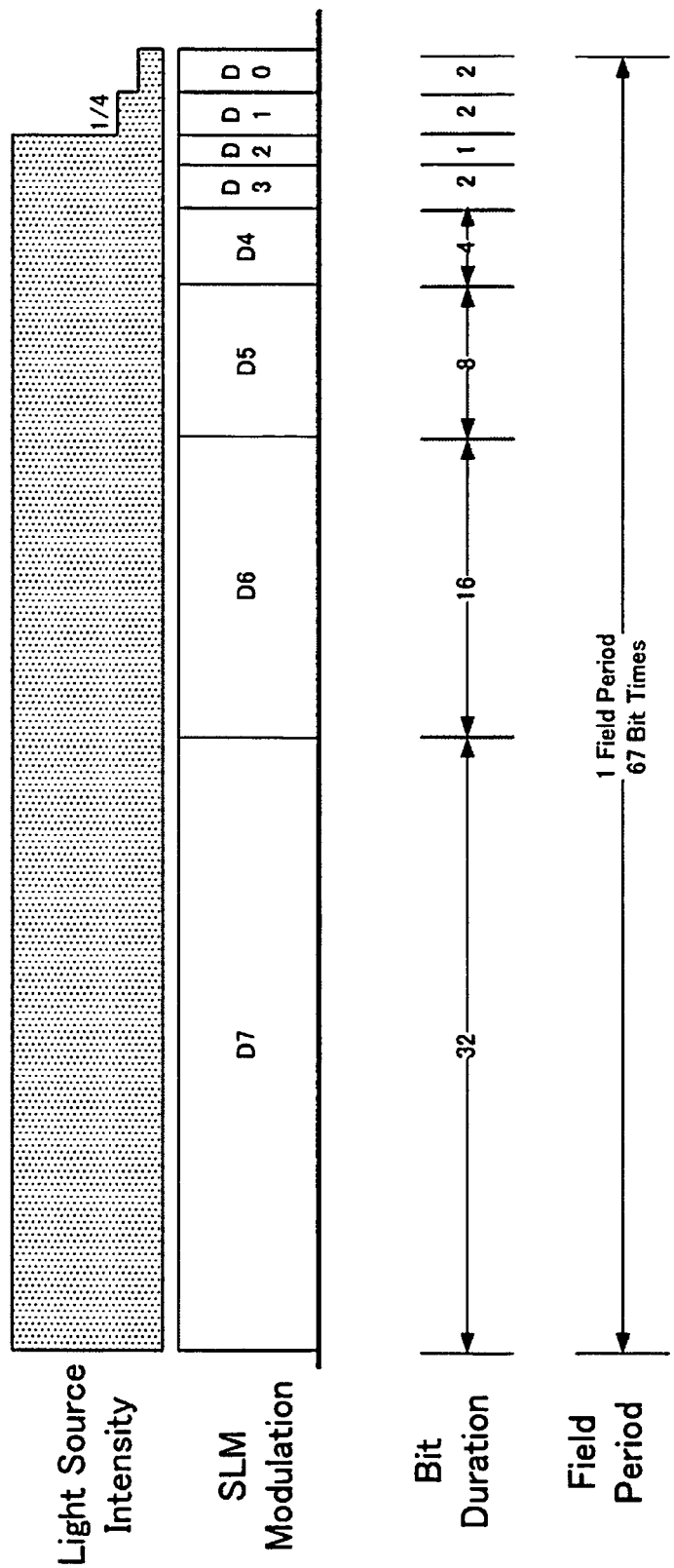
FIG. 12 shows an example of another embodiment of the present invention, MBGC, with the time chart for incoming signal bits, light illumination and bit duration using twice longer time slices than Bit Time for varied light intensity.

FIG. 12 illustrates another embodiment of this invention. When the light source controller does not have enough high speed driving capability, twice longer time slice can be used than Bit Time to repeat and vary the intensity of light source. Although the loss of light energy will increase compared with the case using Bit Time, the requirement of circuit will be reduced.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A display system comprising at least one Spatial Light Modulator (SLM) and at least one variable light source and at least one control unit controlling said SLM and said light source wherein:
  1) said control unit applies multiple-bits image data to control a plurality of micromirrors of the SLM to modulate an illumination light wherein a least significant bit (LSB) of the multiple-bits image data defining a minimum controllable time period for each of the micromirrors of the SLM during a display frame period represented by the multiple-bits image data;
  2) said control unit controls the micromirror to operate at least twice in the display frame period; and
  3) said control unit also simultaneously controls said light source to project different light intensities of the illumination light to the SLM during said minimum controllable time periods to increase a controllable gray scale of the display system without reducing a significant amount of image brightness.

2. The display system according to claim 1, wherein:
said control unit controls the light source to project the illumination light with at least two different light intensities during said minimum controllable time periods.

3. The display system according to claim 1, wherein
said control unit controls the light source to project the illumination light in light pulses having different controllable time widths during said minimum controllable time periods.

4. The display system according to claim 1, wherein
said control unit controls a timing of the light source in projecting the illumination light during said minimum controllable time periods.

5. The display system according to claim 1, wherein:
said control unit controls the waveform of the light source in projecting the illumination light during said minimum controllable time periods.

6. The display system according to claim 1, wherein:
said control unit controls the light source to project the illumination light in light pulses having different controllable numbers of the light pulses during said minimum controllable time periods.

7. The display system according to claim 1, wherein:
said control unit controls the light source to project the illumination light in light pulses having a controllable frequency during said minimum controllable time periods.

8. A display system comprising at least one Spatial Light Modulator (SLM) and at least one variable light source for projecting an illumination light to the SLM, and at least one control unit controlling said SLM and said light source wherein:
  1) said control unit controls said SLM by applying multiple-bits image data wherein each bit of the multiple-bits image data defining a controllable modulation period wherein the control unit applies at least twice a designated bit of the image data to operate the SLM to modulate the illumination light during two designated controllable modulation periods in a frame period represented by the multiple-bits image data; and
  2) said control unit simultaneously controls said light source during said two designated controllable modulation periods to project the illumination light with different light characteristics to said SLM.

9. The display system according to claim 8, wherein:
said control unit controls the light source to project the illumination light with at least two different light intensities during said two designated controllable modulation periods.

10. The display system according to claim 8, wherein:
said control unit controls the light source to project the illumination light in light pulses having different controllable time widths during said two designated controllable modulation periods.

11. The display system according to claim 8, wherein:
said control unit controls a timing of the light source in projecting the illumination light with different timings during said two designated controllable modulation periods.

12. The display system according to claim 8, wherein:
said control unit controls the waveform of the light source in projecting the illumination light with different waveforms during said two designated controllable modulation periods.

13. The display system according to claim 8, wherein:
said control unit controls the light source to project the illumination light in light pulses having two different controllable numbers of the light pulses during said two designated controllable modulation periods.

14. The display system according to claim 8, wherein:
said control unit controls the light source to project the illumination light in light pulses having two different controllable frequencies during said two designated controllable modulation periods.

* * * * *